UNITED STATES PATENT OFFICE.

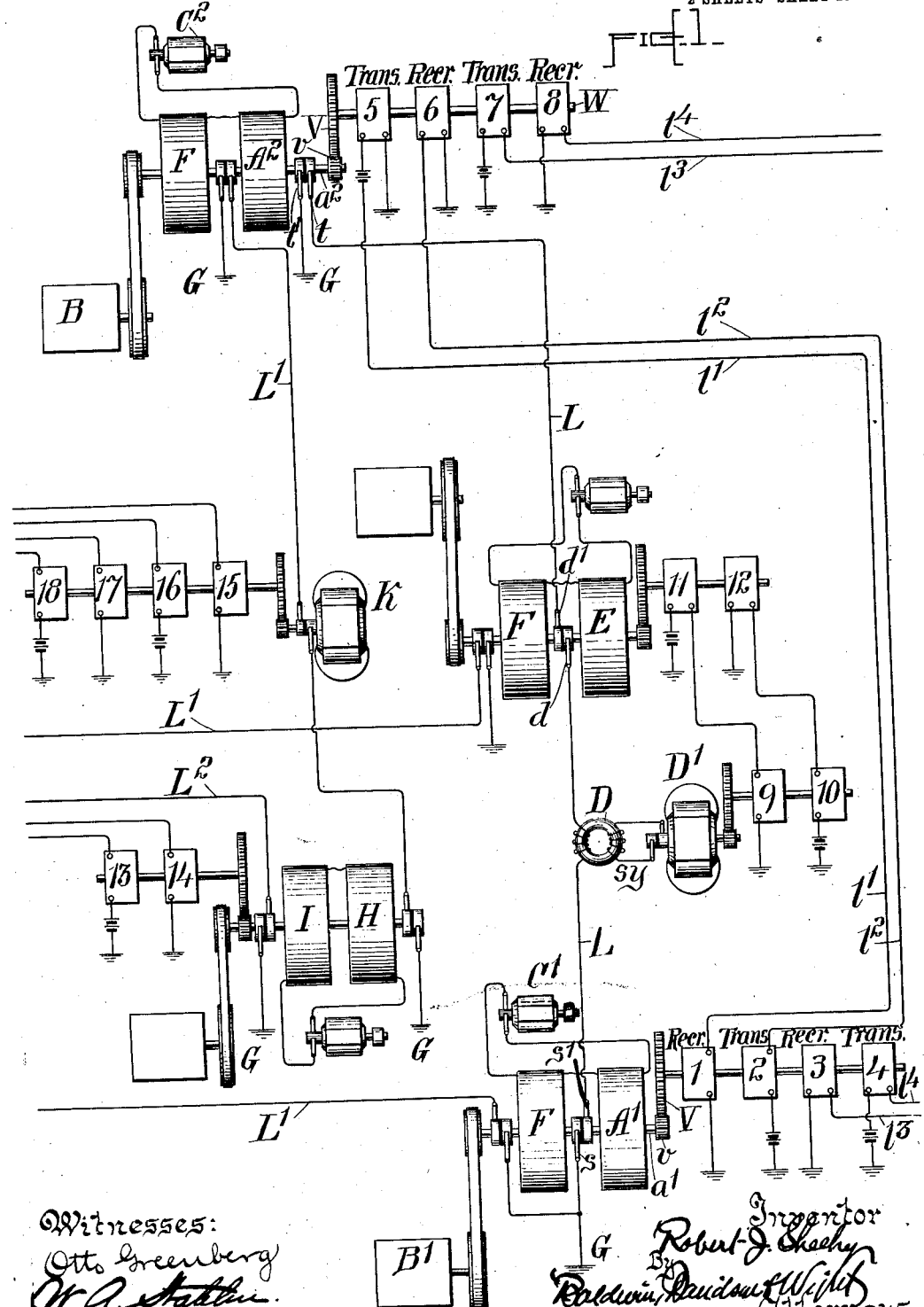

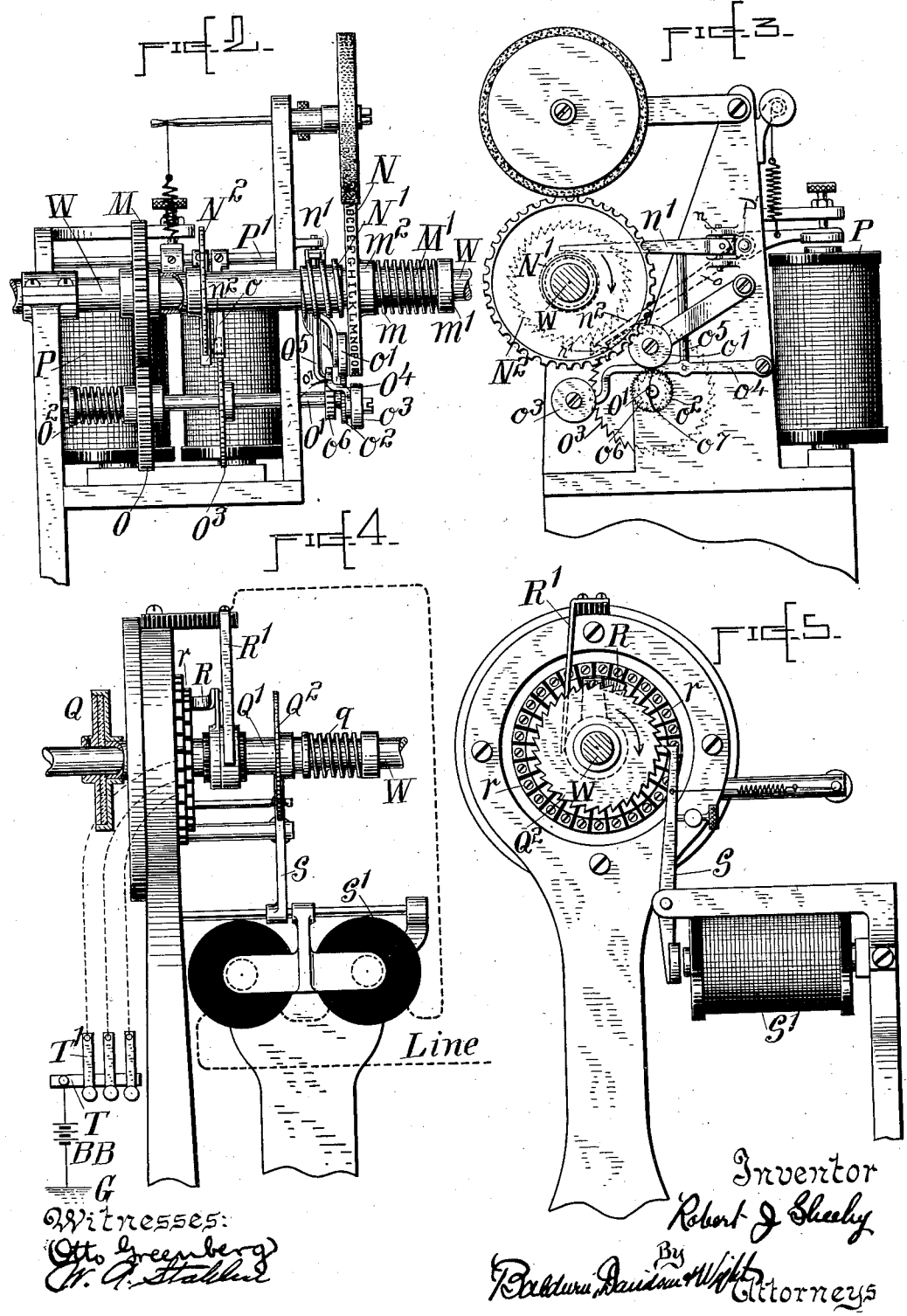

ROBERT J. SHEEHY, OF NEW YORK, N. Y.

TELEGRAPHY.

No. 826,615.  Specification of Letters Patent.  Patented July 24, 1906.

Application filed October 25, 1902. Serial No. 128,788.

*To all whom it may concern:*

Be it known that I, ROBERT J. SHEEHY, a citizen of the United States, residing in the city, county, and State of New York, have invented certain new and useful Improvements in Telegraphy, of which the following is a specification.

The invention relates to an improved organization wherein telegraphic instruments located at different points are all driven in unison or synchronism, so that communications may be exchanged between them.

In carrying out the invention I employ alternating-current electric machines and cause such machines to actuate the individual instruments mechanically. For instance, the current from an alternating-current generator may drive an alternating-current motor, and both machines being run in synchronism the individual telegraph instruments mechanically rotated by the machines will also move in synchronism, and communications may be exchanged between instruments connected by a special or telegraphing line. Thus within proper limits of distance a number of instruments may be actuated in synchronism.

The invention contemplates further organizations whereby I am enabled to maintain a system of synchronously-actuated instruments over large areas and great distances. I employ alternating generators located at different stations and each individually driven by a suitable motor—such, for instance, as a steam-engine—and having their armatures connected in series. It is well known that alternating-current generators when so connected tend to revolve in synchronism or unison with each other, each generator acting as a governor for the other. When the distance between two such connected generators and the resistance and condition of the circuit connecting them permits, I may place one or more independently-driven generators in the line connecting them, or, as above stated, alternating-current motors might be connected in said line. Each machine, whether an individually-driven generator or motor, may mechanically drive or rotate telegraphic instruments and the various instruments be connected as desired by message-lines. Where it is wished to extend the area of the system, other generators may be connected with those already mentioned. For instance, they may be mounted on the same shafts, so that they will be driven each in unison with the generator with which it is connected, and from such additional generators I extend lines to distant generators or motors that mechanically drive telegraphic instruments which must necessarily run in unison with all the other instruments. Locally at any generator I may place an alternating-current electric motor in the generator-circuit and mechanically operate telegraphic instruments thereby, and wherever motors are employed instead of connecting them directly in the generator-circuit I may interpose an electrical transformer or inductorium, as is well understood.

From what has been said it will be seen that all of the alternating-current machines throughout the entire system are tied together and move at regulated speed in unison with each other, and consequently all the telegraphic instruments mechanically driven by such machines must also run practically in synchronism with each other. An instrument at any one point may be connected directly with another at a distant point by an independent telegraphing-line. Of course the telegraph instruments may be duplexed or quadruplexed or arranged in any manner desired, their operation telegraphically being independent of the regulated alternating machines which serve to supply the power to drive or control all the instruments in unison. The alternating machines will be constructed with reference to each other in a manner best adapted to meet the requirements of the system. The telegraphic instruments may be of any character adapted to be driven or controlled mechanically from or by the synchronously-moving shafts of the generators or motors and in which the individual instruments are required to be driven or rotated in unison.

In the accompanying drawings, Figure 1 is a diagram illustrating my invention. Fig. 2 is a front elevation, and Fig. 3 an end elevation, of a printing-telegraph receiving instrument adapted to be used in this system; and Figs. 4 and 5 are similar views of a transmitter, the key-circuits being indicated in the former view diagrammatically.

I show separate instruments for transmission and reception; but of course they might be united in a combined transmitter and receiver, as is common.

Referring to the diagram, A' A² represent two alternate-current electric generators, located at different stations. Their armatures are respectively mounted upon shafts $a'$ $a^2$, driven at approximately the same speed by motors B' B, which may be steam-engines or other sources of power. As usual, the field-magnets of each of these generators are connected, as shown, in the circuit of an ordinary continuous-current exciter $C'$ $C^2$, driven in any suitable manner. The armature-terminals of the generators are connected, as usual, to ordinary contact-rings, on which ordinary brushes $s$ $s'$ and $t$ $t'$ bear. One brush $s$ of the generator A' is grounded (a ground-circuit being in this particular instance illustrated) and the other, $s'$, is connected by the synchronizing-line L with the brush $t$ of the generator $A^2$, whose other brush $t'$ is grounded. The armatures of the two machines are thus connected in series, and by reason of the dynamic effects of the currents traversing the conductor L the two armatures will be compelled to revolve in unison with each other.

Each generator mechanically drives a series of telegraphic instruments numbered 1, 2 3 4 and 5 6 7 8 by gear connections between the armature-shafts and shafts of the individual telegraph instruments, as shown, or otherwise. In the drawings a pinion $v$ on each generator-shaft gears with and drives a gear V on a shaft W common to all the instruments operated by that generator. The instruments are marked alternately "Trans." and "Recr.," indicating that they are respectively transmitting and receiving instruments. The details of construction of suitable instruments to be operated in this way are hereinafter described.

I have shown telegraphing-lines $l'$ $l^2$ connecting the receivers and transmitters 1 and 2 with the receivers and transmitters 5 and 6. Other telegraphing-lines $l^3$ $l^4$ are shown leading from the receiver 3 and 7 and the transmitter 4 and 8, and these lines are to be connected with any of the other instruments of the system.

Obviously the telegraphic instruments thus far referred to must all move in unison, and messages or communications may therefore be exchanged between them.

At D an ordinary transformer is diagrammatically illustrated connected in the line L, an alternating-current electromotor D' being connected in its secondary circuit $sy$. This motor must rotate in unison with the alternating currents traversing the line, and consequently in synchronism with the generators A' $A^2$. The telegraphic instruments 9 10, mechanically driven by the motor, therefore rotate in unison with the other instruments already referred to.

At E an independently-driven alternating-current electric generator is shown, its brushes $d$ $d'$ being connected with the line L and its armature being therefore in the line L and in series with the armatures of the generators A' $A^2$. The generator E will therefore revolve in unison with the generators A' $A^2$, and the telegraphic instruments 11 12 mechanically driven thereby must rotate in unison with all the other instruments above referred to.

To permit of a further extension of the system, any one of the generators may have connected with it another generator, as follows, and as shown at A', $A^2$, and E: On the same shaft with the armature of either A', $A^2$, or E another generator F may be mounted, so that the two armatures move as one. The generator F being a duplicate of the other, the impulses traversing its armature-circuit must coincide with those traversing the armature-circuit of the other generator. From the brushes of the generators F lines L' extend to distant points where they are to connect with other generators or motors that mechanically actuate telegraphic instruments which will operate in unison with those already mentioned, and these latter generators may be connected with others and the system indefinitely extended. Thus the armature of the generator F on the same shaft with the generator $A^2$ is connected by a line L', leading to an independently-driven generator H, and on the same shaft with the armature of the generator H is the armature of a generator I, from which a line $L^2$ extends. Telegraph instruments 13 14 are shown as driven by this shaft, and they will move in unison with all the other telegraph instruments.

Electric motors K may be connected in the lines L L' $L^2$, as already stated. Assuming that the generators are located at principal cities where telegraph offices are operated, the motors may be located in such offices, and one motor may drive a comparatively large number of telegraph instruments. Thus at the generators F $A^2$ an alternating-current electric motor may be included in either line L or L'. This motor K is shown in the line L' and is indicated as driving instruments 15 16 17 18.

Any instrument located at any point in the system will move practically in unison with all the other instruments and may therefore be connected by a telegraphing-line with any of the instruments provided the distance or the resistance of the conductors is not so great as to prohibit such a direct connection.

Where generators are shown, the motors are illustrated as driving the generator-shaft and through that shaft the printing instruments, and of course the regulation of the generators also controls the speed of the motor; but I do not confine myself to this precise construction, for it is evident that shafts or other mechanical devices connected with the motors independently of the generators may be employed for mechanically driving the moving parts of the individual instruments of the system.

Having described the general organization, purpose, and capacities of the system, I will now describe in detail one form of instrument adapted to be mechanically operated by the synchronously-moving machines. These instruments are represented in Figs. 2, 3, 4, and 5. In each figure W represents the driven shaft. Figs. 2 and 3 show a receiver. On the shaft W is fixed a gear-wheel M, and on the shaft beyond the gear is a loose sleeve M', whose end or a plate thereon is frictionally clamped against the side of the wheel by a spring $m$, fixed at one end to a collar $m'$ on the shaft and at the other end to a collar $m^2$ on the sleeve. The sleeve carries a type-wheel N, a unison-worm N', and a toothed detent-wheel $N^2$. The unison stop-arm $n'$ is pivoted on the frame by two transverse pivots at $n$ and at the proper time arrests the sleeve and type-wheel at the unison-point. This is an ordinary unison-stop, well known, and needs no further description. The gear M drives a gear O on a counter-shaft O' and coupled therewith by an ordinary friction-clutch $O^2$. This shaft has fast thereon a toothed detent-wheel $O^3$. The magnet P is included in the telegraphing-line leading to the instrument. Its armature is mounted on a rock-shaft P', which carries two detent or catch arms $n^2$ and $o$, that respectively engage the detent-wheels $N^2$ and $O^3$. Normally when the armature-lever is retracted by its spring the catch $o$ engages the wheel $O^3$, and the shaft O' is held at rest, and the catch $n^2$ is disengaged from the detent-wheel $N^2$, and the type-wheel is actuated by the shaft W. When an impulse traverses the coils of the magnet P, its armature is attracted, the catch $n^2$ engages the wheel $N^2$, and the type-wheel is arrested at the desired letter. At the same time the shaft O' is released and is driven by the shaft W through the gears M O to effect the following operation: The paper upon which the impression is to be taken passes between paper-feed rolls $o'$ $o^2$, the latter of which has a serrated face, as usual, and is mounted on the shaft O', and thence over a platen $o^3$, carried in the end of a platen-lever $o^4$, pivoted on the frame and having a vertical arm $o^5$ for throwing off the unison. A toothed wheel $o^6$ in the shaft O' works against the platen-lever at $a^7$ and throws up the platen on each movement of the shaft O', and at the same time the paper is fed forward.

The transmitter (shown in Figs. 4 and 5) is constructed as follows: The shaft W carries a clutch-disk Q, against which a plate on the end of a sleeve Q', enveloping the shaft, is pressed by a spring $q$, the arrangement being an ordinary friction-clutch. The insulated sunflower-segments $r$ are mounted on the frame, and the insulated trailer R, traversing them, is carried by the sleeve Q'. The sleeve also carries a toothed detent-wheel $Q^2$. The armature-lever S of the magnet S' acts as a stop or detent for the wheel $Q^2$. The circuit connections are as follows: B B represent the transmitting-battery, having one pole grounded and the other connected with the front stops T, common to all the transmitting-keys T'. Each key is connected with its sunflower-segment, from whence the circuit extends through the trailer and insulated brush R' bearing on the hub thereof through the coil of the magnet S' to line. Of course each operator may be given a combination instrument. Such an instrument may be obtained by supplying one transmitter and one receiver for each operator and connecting the line after it leaves the magnet S' through the magnet P, suitable switches being provided as usual.

These instruments are illustrated and described, not as instruments that must be employed in my system, but as instruments adapted and suitable to be used and as illustrative of one class of instruments that may be used; but in all cases the individual instruments are such as to be mechanically driven from the generators or motors.

I do not broadly claim, in a telegraph system, synchronously-moving alternating-current machines located at different stations, an electrical connection between them, and telegraphic instruments in circuit at said stations, nor do I claim the combination of synchronously-moving alternating-current machines located at different points and having an electric connection between them, with telegraphic instruments located at such points, the circuit of which instruments is completed through synchronously-moving mechanism controlled by the alternating-current machines, as would be the case if, for instance, the alternating-current machines herein described were caused to revolve contacts or trailers over circles of segments for multiplex telegraphic transmission.

I claim as my invention—

1. The combination, substantially as set forth, with two synchronously-moving alternating-current electric machines located at distant stations and connected by a synchronizing-line, of series of printing-telegraph instruments, one series at each machine, whose type-wheels are mechanically driven thereby, a clutch connection between each type-wheel and its driving shaft or mechanism, telegraphing-lines connecting instruments at one station with instruments at another, and means whereby the type-wheels may be arrested by currents transmitted over the telegraphing-lines.

2. The combination, substantially as set forth, of two motors located at different stations, an alternating-current electric generator driven by each motor, a series of printing-telegraph instruments at each generator, a mechanical connection including a clutch between each type-wheel and the generator-shaft, a synchronizing-circuit connecting the armatures of the generators, telegraphing-circuits connecting the printing instruments at the two stations, and means whereby the type-wheel of any instrument may be arrested by current traversing its line.

3. The combination, with two alternate-current electric generators mechanically coupled with each other, of a third alternate-current generator mechanically separated therefrom and electrically connected to the armature-circuit of one of the first-named generators, synchronously-moving printing-telegraph instruments, controlled by the generators, and telegraph-lines connecting said instrument.

4. The combination with two alternating-current electric generators, mechanically coupled with each other, of a third alternating-current generator mechanically separated therefrom and electrically connected to the armature-circuit of one of the first-named generators; a fourth alternating-current generator mechanically separated from and electrically connected with the armature-circuit of the other one of said first-named mechanically-connected generators, and synchronously-moving telegraphic instruments controlled by each generator.

5. The combination of two independently-driven alternating-current electric generators located at different stations, a synchronizing-circuit connecting the armatures of said generators, an alternating-current electric motor driven by currents derived from said circuit, and synchronously-moving telegraph instruments, controlled by the generators and driven by the motor, all of said instruments being thereby actuated in unison.

6. The combination, substantially as set forth, of an alternating-current electric generator, a transformer, a line connecting the armature-circuit of the generator through the primary coil of the transformer, an alternating-current electric motor connected in the secondary of the transformer, two or more individually mechanically rotated telegraphic instruments whose rotating parts are controlled by the generator, two or more like instruments individually driven from the shaft of the motor to run in unison with those controlled by the generator, and telegraph-lines connecting the telegraphic instruments.

7. The combination, substantially as set forth, of an alternating-current electric generator, an alternating-current electric motor, a circuit connecting the armature-circuit of the generator through the motor, whereby the generator and motor are caused to rotate synchronously with reference to each other, a series of individually mechanically rotated telegraphic instruments whose rotating parts are mechanically controlled by the shaft of the generator, a series of like instruments driven by the motor to run in unison with those controlled by the generator, and telegraph-lines connecting the telegraphic instruments.

8. The combination, substantially as set forth, of two alternating-current electric machines, a synchronizing-line connecting them, a series of individually mechanically rotated telegraphic instruments whose rotating parts are mechanically controlled by the shaft of each machine so that they all run in unison, and telegraph-lines connecting the telegraphic instruments.

9. The combination with a generator of alternating electric currents, of a second generator, connected in circuit therewith, telegraphic apparatus, driven by the shafts of one of said generators, an electric motor driven by currents derived from said circuit, and telegraphic apparatus controlled thereby and operating in unison with the first-named telegraphic apparatus.

In testimony whereof I have hereunto subscribed my name.

ROBERT J. SHEEHY.

Witnesses:
KATHARINE MacMAHON,
WILLIAM A. STAHLIN.